United States Patent
Uddenberg et al.

(10) Patent No.: US 7,738,366 B2
(45) Date of Patent: Jun. 15, 2010

(54) METHODS AND STRUCTURE FOR DETECTING SAS LINK ERRORS WITH MINIMAL IMPACT ON SAS INITIATOR AND LINK BANDWIDTH

(75) Inventors: David T. Uddenberg, Colorado Springs, CO (US); Mark Slutz, Colorado Springs, CO (US); Brian J. Varney, Colorado Springs, CO (US)

(73) Assignee: LSI Corporation, Milpitas, CA (US)

(*) Notice: Subject to any disclaimer, the term of this patent is extended or adjusted under 35 U.S.C. 154(b) by 1230 days.

(21) Appl. No.: 11/224,771

(22) Filed: Sep. 13, 2005

(65) Prior Publication Data

US 2007/0070885 A1      Mar. 29, 2007

(51) Int. Cl.
*H04L 12/28* (2006.01)
(52) U.S. Cl. .............. 370/229; 370/252; 714/4
(58) Field of Classification Search ............ 370/242, 370/244, 245, 250, 252, 216, 217, 221, 225, 370/228, 230, 235
See application file for complete search history.

(56) References Cited

U.S. PATENT DOCUMENTS

| | | | | |
|---|---|---|---|---|
| 5,260,945 A | * | 11/1993 | Rodeheffer | 714/4 |
| 6,570,881 B1 | * | 5/2003 | Wils et al. | 370/410 |
| 7,124,234 B2 | * | 10/2006 | Marushak et al. | 710/316 |
| 7,320,084 B2 | * | 1/2008 | Steinmetz et al. | 714/4 |
| 2003/0156552 A1 | * | 8/2003 | Banker et al. | 370/266 |
| 2004/0085894 A1 | * | 5/2004 | Wang et al. | 370/216 |
| 2004/0205288 A1 | * | 10/2004 | Ghaffari et al. | 711/100 |
| 2005/0169170 A1 | * | 8/2005 | Ghaffari | 370/229 |
| 2006/0061369 A1 | * | 3/2006 | Marks et al. | 324/542 |
| 2006/0101171 A1 | * | 5/2006 | Grieff et al. | 710/36 |
| 2006/0168228 A1 | * | 7/2006 | Vasudevan et al. | 709/226 |
| 2007/0011373 A1 | * | 1/2007 | Marks et al. | 710/104 |

* cited by examiner

*Primary Examiner*—Steven H Nguyen
(74) *Attorney, Agent, or Firm*—Duft Bornsen & Fishman LLP

(57) ABSTRACT

Methods and structures within a SAS expander for detecting link level errors in PHYs of a SAS expander to reduce overhead bandwidth utilization of SAS links between SAS initiators and SAS expanders. In one aspect hereof, a SAS expander self monitors the error status registers of its own PHYs over an internal path that does not use bandwidth of the attached SAS links. When a link level error is so detected the SAS expander may initiate actions and/or report the error to a SAS initiator to thereby reduce the potential for lost data integrity. Where multiple SAS expanders are configured in a SAS domain fabric, each expander may monitor its PHYs or one expander may be designated a master and monitor PHYs of all expanders in the fabric.

20 Claims, 4 Drawing Sheets

METHODS AND STRUCTURE FOR DETECTING SAS LINK ERRORS WITH MINIMAL IMPACT ON SAS INITIATOR AND LINK BANDWIDTH

BACKGROUND OF THE INVENTION

1. Field of the Invention

The invention relates generally to serial attached SCSI ("SAS") domains and more specifically to methods and structures for more easily detecting SAS link errors in a SAS expander while minimizing impact on the SAS initiators and on SAS link bandwidth utilization.

2. Discussion of Related Art

Small Computer Systems Interface ("SCSI") is a set of American National Standards Institute ("ANSI") standard electronic interface specification that allow, for example, computers to communicate with peripheral hardware. Common SCSI compatible peripheral devices may include: disk drives, tape drives, CD drives ("CD-ROM", "CD-RW", etc), DVD drives, printers and scanners. SCSI as originally created included both a command/response data structure specification and an interface and protocol standard for a parallel bus structure for attachment of devices. SCSI has evolved from exclusively parallel interfaces to include both parallel and serial interfaces. "SCSI" is now generally understood as referring either to the communication transport media (parallel bus structures and various serial transports) or to a plurality of primary commands common to most devices and command sets to meet the needs of specific device types as well as a variety of interface standards and protocols.

The collection of primary commands and other command sets may be used with SCSI parallel interfaces as well as with serial interfaces. The serial interface transport media standards that support SCSI command processing include: Fibre Channel, Serial Bus Protocol (used with the Institute of Electrical and Electronics Engineers 1394 FireWire physical protocol; "IEEE 1394") and the Serial Storage Protocol (SSP).

SCSI interface transports and commands are also used to interconnect networks of storage devices with processing devices. For example, serial SCSI transport media and protocols such as Serial Attached SCSI ("SAS") and Serial Advanced Technology Attachment ("SATA") may be used in such networks. These applications are often referred to as storage networks. Those skilled in the art are familiar with SAS and SATA standards as well as other SCSI related specifications and standards. Information about such interfaces and commands is generally obtainable at the website http://www.t10.org.

Such SCSI storage networks are often used in large storage systems having a plurality of disk drives to store data for organizations and/or businesses. The network architecture allows storage devices to be physically dispersed in an enterprise while continuing to directly support SCSI commands directly. This architecture allows for distribution of the storage components in an enterprise without the need for added overhead in converting storage requests from SCSI commands into other network commands and then back into lower level SCSI storage related commands.

A SAS network typically comprises one or more SAS initiators coupled to one or more SAS targets often via one or more SAS expanders. In general, as is common in all SCSI communications, SAS initiators initiate communications with SAS targets. The expanders expand the number of ports of a SAS network domain used to interconnect SAS initiators and SAS targets (collectively referred to as SAS devices or SAS device controllers).

In general, a SAS initiator directs information to a SAS target device through ports of one or more SAS expanders in the SAS domain. A "port" in SAS terminology is a logical concept. A port may comprise one or more physical links in a SAS domain. Such physical links are often referred to as PHYs in the terminology of SAS domains. A port may use a single PHY or, if the port is configured as a wide port, may use multiple PHYs logically grouped to provide higher bandwidth.

Link errors during such transmissions may result in bad frame transmissions, lost frames or primitives, etc. To avoid substantial loss of data integrity due to such errors, SAS initiators at present periodically scan or poll the ports of a SAS expander to attempt to quickly detect when an error has occurred. Any such scanning or polling of expander links by a SAS initiator uses valuable communication bandwidth on the SAS communication links (i.e., on one or more PHYs in the SAS domain coupling SAS expanders to the SAS initiator). In addition, in hopes of quickly detecting occurrence of such errors, the SAS initiator may frequently perform such scans to detect the problem quickly after initial occurrence of the error. Such frequent scanning or polling by a SAS initiator further exacerbates the problem of abusing available bandwidth.

It is a particular problem to detect link level errors in operation of SAS expanders in an efficient manner reducing overhead consumption of communication bandwidth.

It is therefore evident from the above discussion that a need exists for improved solutions in a SAS domain to quickly identify physical link errors and to do so without significant impact on the available bandwidth of the SAS domain.

SUMMARY OF THE INVENTION

The present invention solves the above and other problems, thereby advancing the state of the useful arts, by providing methods and structures for rapidly detecting SAS link errors within a SAS expander. The detection is performed by reading error status registers within the SAS expander without use of communication bandwidth between the expander and SAS initiator devices. The SAS expander itself reads its own error status registers to detect link errors and then may act to reduce potential loss of data integrity.

A first feature hereof provides a method for detecting link level errors for links in a SAS expander, the method comprising: periodically reading error status registers within said SAS expander and associated with said links wherein the step of reading is performed within the SAS expander without utilizing bandwidth of any SAS links coupled to the SAS expander; and notifying a SAS initiator when a periodic reading of said error status registers detects a link error in an associated failed SAS link.

Another aspect hereof further provides for initiating an action within the SAS expander to preclude further loss of data integrity on the failed SAS link following detection of said link error.

Another aspect hereof further provides that, where the failed SAS link is directly coupled to a SAS device as a standard width SAS port, the step of initiating an action further comprises: shutting down the failed SAS link to prevent further frame transmissions thereon.

Another aspect hereof further provides that, where the failed SAS link is part of a SAS wide port, that the step of initiating an action further comprises: restricting frames to transmission over other links if the SAS wide port.

Another aspect hereof further provides that the step of initiating an action further comprises: issuing an OPEN REJECT for frames destined to a SAS target device connected to the failed link.

Another aspect hereof further provides that the step of initiating an action further comprises: performing a PHY reset on the failed link; and monitoring operation of the failed link in response to the PHY reset to determine if the error persists.

Another aspect hereof further provides that the SAS expander is one of multiple SAS expanders configured in a SAS domain and provides that the method further comprises: designating one of the multiple SAS expanders a master SAS expander, wherein the step of periodically reading is performed within the master SAS expander to read error status registers within the master SAS expander and to read error status registers within other SAS expanders of the multiple SAS expanders in the SAS domain.

Another feature hereof provides, in a SAS domain including a SAS initiator, apparatus comprising: a SAS expander having multiple PHYs associated therewith and at least one of said multiple PHYs coupled to the SAS initiator wherein the SAS expander includes: a link error status register indicative of a link error associated with at least one PHY of the multiple PHYs; a link error detector coupled to the link error status register for detecting occurrence of a link error on the failed PHY by reading the link error status register; and a link error notifier for notifying the SAS initiator of a detected error.

Another aspect hereof further provides that the SAS expander further includes: a link error handler for initiating an action to reduce potential for lost data integrity on the failed PHY.

Another aspect hereof further provides that the failed PHY is one of multiple PHYs comprising a SAS wide port and wherein the link error handler is operable to restrict transmission of frames to non-failed PHYs of the multiple PHYs comprising the SAS wide port.

Another aspect hereof further provides that the link error handler further comprises: means for issuing an OPEN REJECT for frames destined to a SAS target device connected to the failed PHY.

Another aspect hereof further provides that the link error handler further comprises: means for performing a PHY reset on the failed link; and means for monitoring operation of the failed link in response to the PHY reset to determine if the error persists.

Another aspect hereof further provides that the SAS expander is designated a master SAS expander and wherein the apparatus further comprises: a second SAS expander having associated error status registers, wherein the master SAS expander is adapted to read the error status registers associated with the second SAS expander without utilizing communication bandwidth between the master SAS expander and the SAS initiator.

DETAILED DESCRIPTION OF THE DRAWINGS

Figure 1:
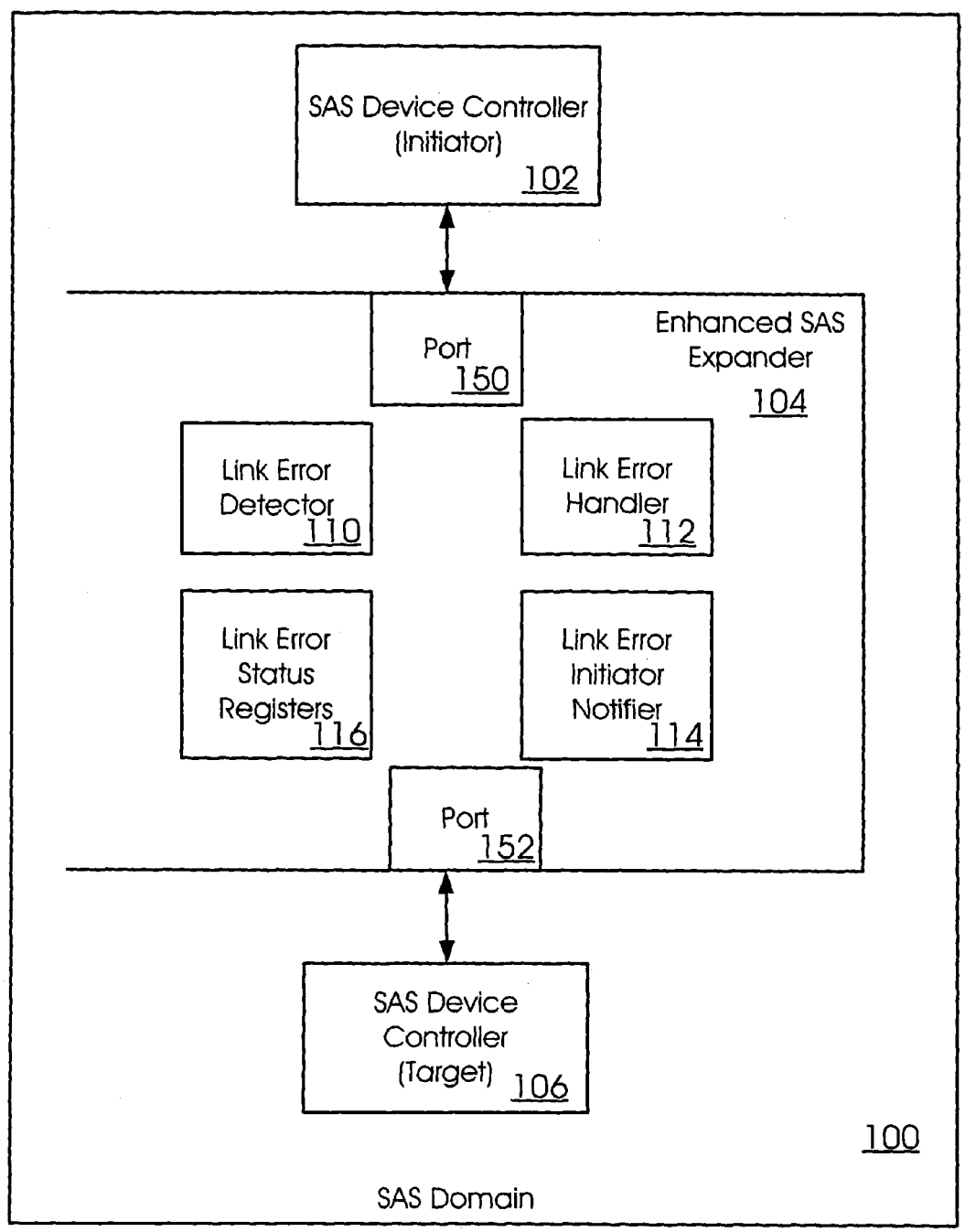
FIG. 1 is a block diagram of a SAS domain embodying features and aspects hereof for SAS expander link error self monitoring.

FIG. 1 is a block diagram of an exemplary SAS domain 100 including features and aspects hereof. SAS domain 100 may include a plurality of SAS devices (some acting as initiator devices 102 and some acting as target devices 106) and one or more SAS expander components 104 to permit flexible expansion and configuration of ports coupling the various SAS devices to one another. As shown in FIG. 1, SAS device controllers 102 and 106 are coupled to one another through SAS expander 104 on associated ports 150 and 152, respectively. Though not shown, it is common for devices to be coupled through multiple paths and/or multiple expanders. In other words, multiple redundant ports and paths may be employed to couple SAS devices and SAS expanders to one another.

"SAS component" as used herein refers to SAS devices (or SAS device controllers—whether initiators or targets) as well as SAS expanders. "SAS device controller" as used herein refers to control logic features within a SAS device used for coupling the SAS device to the SAS domain. Such a SAS device controller may be implemented as standard or customized circuits providing logic for interacting with other SAS components of a SAS domain in accordance with SAS specifications. Further, such a SAS device controller may be implemented as programmed instructions executed by a suitably programmable general or special purpose processor. Such design choices to implement as custom or standard circuits or as programmed instructions are well known to those of ordinary skill in the art. Similarly, SAS expander 104 may be implemented as customized or standard integrated circuit components or other electronic circuit designs. Often, such SAS expander circuit designs include programmable general or special purpose processors such that various logic and control features of the SAS expander may be provided by suitably programmed instructions. Such design choices for SAS expander components are well known to those of ordinary skill in the art.

A SAS expander 104 provides a plurality of links or "PHYS" for exchanging data ("frames") with links/PHYs of other expanders or SAS devices. As used herein, "link" refers to a physical connection to a communication medium. Typically, in SAS terminology, such a link is referred to as a PHY. By contrast, a "port" as used herein is a logical concept that may be mapped to one or more associated PHYs. For example, where a port is mapped to a single PHY, the port and the link are essentially the same object. However, where a logical port is a "wide port" according to SAS specifications, the wide port may comprise multiple PHYs aggregated as a logical port to provide higher bandwidth communication between a SAS initiator and a corresponding SAS expander or SAS target.

In accordance with features and aspects hereof, SAS expander 104 includes features to detect link level errors on links/PHYs associated with the SAS expander 104 and to notify an associated SAS initiator device 102 of such detected link errors. By contrast, as noted above, prior techniques required a SAS initiator device (e.g., 102) to periodically scan or poll a SAS expander (e.g., 104) to detect occurrence of a link level failure. Such scanning or polling utilizes valuable communication bandwidth on the associated port 150 coupled to the SAS initiator device. By incorporating the link error detection and a link error notification of a SAS initiator device within SAS expander 104, utilization of valuable port bandwidth for overhead purposes of error detection is minimized.

More specifically, SAS expander 104 may include a link error detector 110 that scans ports (e.g., 150 and 152) for many types of link errors. Such link errors may be detected, for example, by reference to information in link error status registers 116. One or more status registers are typically provided within a SAS expander 104 to permit standardized reading of information regarding the status of each link/PHY of the SAS expander. Where prior techniques required the SAS initiator device 102 to scan or poll SAS expander 104 to read the status registers 116, features and aspects hereof continually self-monitor changes in the link error status registers 116 by operation of link error detector 110 within SAS expander 104.

Further, SAS expander 104 may include a link error handler component 112 for processing a link failure detected by the expander 104. Link error handler 112 may perform appropriate action to handle a detected link error in conjunction with the link error self-monitoring features within SAS expander 104. For example, link error handler 112 may disable further operation of the failed link and/or the logical port associated with the failed link/PHY. Where a logical port maps to a single PHY, disabling of the link/PHY inherently disables operation of the associated logical port. By contrast, where a failed link is associated with a SAS wide port, disabling a single link/PHY does not necessitate disabling operation of the associated SAS wide port. Rather, the SAS wide port may continue operation though with reduced available bandwidth.

Still further, SAS expander 104 may include link error initiator notification component 114 operable to notify an associated SAS initiator device when a link error is sensed. In general, notification involves an exchange of information between the enhanced SAS expander 104 and a SAS initiator 102. A SAS initiator 102 will request the current error information by polling the enhanced SAS expander for the most recent error information. However, since the enhanced SAS expander 104 has already initiated actions to reduce possible further loss of data integrity, the polling by the SAS initiator may be far less frequent than prior techniques and thus far less abusive of communication bandwidth between the SAS initiator device and the enhanced SAS expander 104.

Such notification exchanges may be transmitted using, for example, the SMP or SSP SAS protocols—protocols well known to those of ordinary skill in the art. Though this notification exchange message utilizes a small amount of available bandwidth on the port in the communication path returning to the SAS initiator device (e.g. port 150), the elimination of SAS initiator device scanning/polling operations on the associated SAS link/PHY (e.g., port 150) to initially detect error conditions frees substantial communication bandwidth for exchange of application data. In addition, where a SAS expander 104 is further enhanced to act in the role of a SAS initiator and where the SAS initiator device may act in the role of a SAS target, the enhanced SAS expander may initiate a notification exchange as needed with the SAS initiator (acting in the role of a SAS target for this limited purpose). Such an exchange initiated by the enhanced SAS expander may further reduce overhead utilization of the bandwidth of the communication path between the SAS imitator and the enhanced SAS expander.

Still further, the error handler component 112 may include features to modify communication parameters of the PHY/link on which an error has been sensed. The modifications may be enacted by processing within the error handler component 112 or other elements within the enhanced SAS expander 104. Such modifications to the link communication parameters allows the enhanced SAS expander 104 to attempt corrective actions for the sensed errors rather than merely actions to avoid further loss of data integrity.

FIG. 1 is intended merely as exemplary of one possible SAS domain 100 including SAS expander 104 enhanced in accordance with features and aspects hereof. Those of ordinary skill in the art will readily recognize a wide variety of equivalent structures defining a SAS domain including one or more SAS initiator devices, one or more SAS target devices and one or more SAS expander devices. Still further, the particular functional decomposition of operational elements and components within SAS expander 104 is intended merely for discussion of enhanced features and aspects hereof. Numerous additional functional elements may be included within enhanced SAS expander 104. Further, the functional elements depicted in FIG. 1 may be further integrated with one another and/or integrated with other functional elements not shown within the SAS expander 104. Such design choices for integration and separation of functional components are well known to those of ordinary skill in the art. Thus, FIG. 1 is intended merely as representative of one exemplary embodiment of particular features and aspects hereof as they may be implemented within an enhanced SAS expander.

Figure 2:
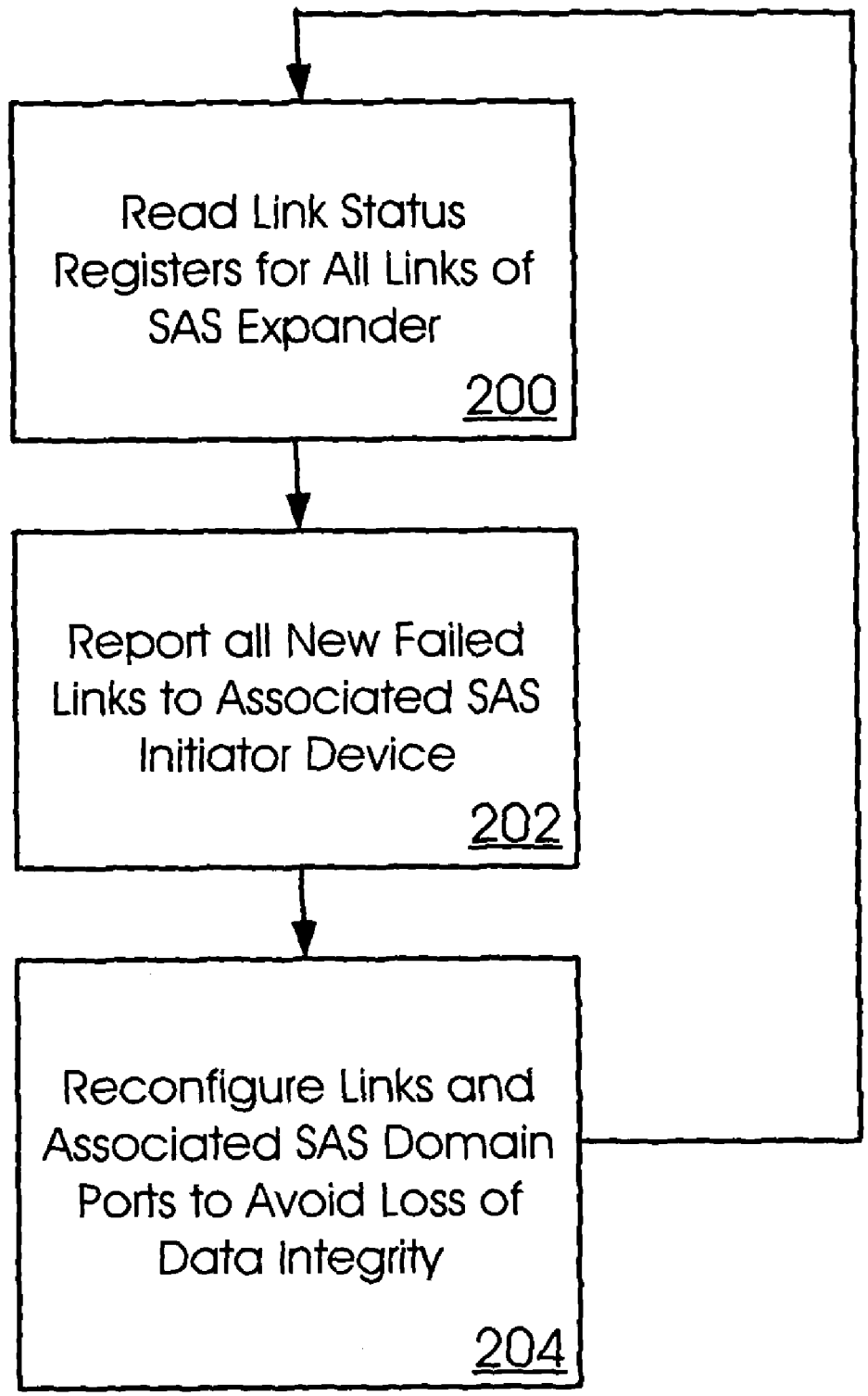
FIG. 2 is a flowchart describing a method operable within a SAS expander enhanced in accordance with features and aspects hereof for SAS expander link error self monitoring.

FIG. 2 is a flowchart describing a method associated with features and aspects hereof operable within an enhanced SAS expander. As noted above, a SAS expander enhanced in accordance with features and aspects hereof performs link error self-monitoring by scanning error status registers for all links/PHYs associated with the SAS expander. The self-monitoring procedures operate solely within the SAS expander. Thus, the need for scanning or polling message exchanges between a SAS initiator device and an associated SAS expander is obviated.

Elements 200 through 204 of a FIG. 2 may be iteratively operable as a process within a SAS expander enhanced in accordance with features and aspects hereof. Element 200 first reads the link error status registers associated with all links of the SAS expander. In general, all SAS expander implementations include one or more registers or other storage means for storing status information regarding each link/PHY associated with the expander. Thus, element 200 represents processing within an enhanced SAS expander to read the link status register or registers for all links/PHYs of the expander. Key to the invention is that the processing of element 200 to read the link error status register(s) is performed by processing within the SAS expander devoid of overhead communications between the SAS initiator device and SAS expander. Where prior known techniques required the SAS initiator device to utilize a valuable communication bandwidth to periodically scan or poll such link error status registers, the processing of element 200 utilizes no such overhead communication bandwidth. Rather, localized processing independent of the SAS communication media and ports is utilized to perform the processing of element 200 through 204. Element 202 of FIG. 2 is then operable to identify any newly detected failures of links/PHYs based on the link error status register information read by operation of element 200. Element 202 then identifies any newly detected failures of links/PHYs based on the newly retrieved links error status register information. Where element 202 determines that one or more links/PHYs have failed, element 204 is then operable to reconfigure the failed links and any association SAS domain logical ports of the SAS expander to reduce the possibility of further loss of data integrity. Exemplary link errors that may be sensed by operation of features and aspects hereof may include, without limitation, incorrect DWORD disparity in a transmission, loss of DWORD bit synchronization, invalid DWORD errors, etc.

Figure 3:
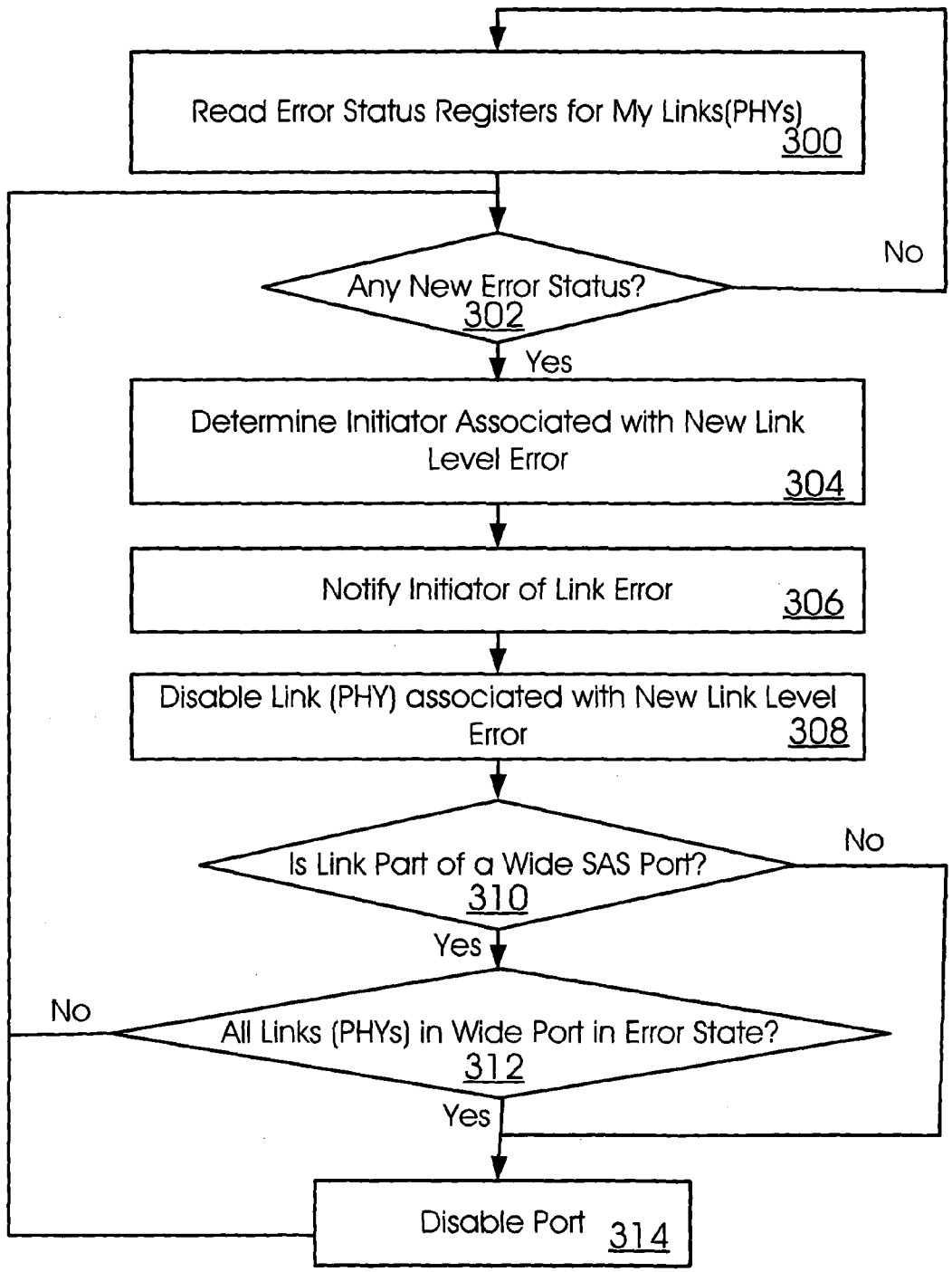
FIG. 3 is a flowchart describing a method operable within a SAS expander enhanced in accordance with features and aspects hereof for SAS expander link error self monitoring.

FIG. 3 is a flowchart providing additional details of an exemplary method operable within a SAS expander enhanced in accordance with features and aspects hereof to provide self-monitoring of link/PHY errors. In addition, as shown in FIG. 3, an enhanced SAS expander may also take action to help prevent further loss of data integrity when an error is sensed.

Elements 300 through 314 may be iteratively operable within an enhanced SAS expander to continually monitor for link error status information by, for example, reading link error status registers associated with the links of the SAS expander. When a link error is detected, an associated SAS initiator device may be notified of the link error and action may be taken by the SAS expander to help avoid further loss of data integrity.

In particular, element 300 is first operable to read the link error status registers for all links/PHYs associated with the enhanced SAS expander. As noted above, such information may be stored, for example, in status registers or other storage structures associated with the PHYs or links of the SAS expander. Element 302 is then operable to determine whether any new error status is indicated by the recently read status registers. If not, processing continues looping back to element 300 to continue reading link error status registers associated with the SAS expander.

If element 302 determines that some new error condition has arisen on some link/PHY associated with the expander, processing continues with element 304 to determine a SAS initiator device associated with the new link level error condition sensed by elements 300 through 302. Element 306 provides an appropriate notification to the identified initiator device to notify the SAS initiator that the associated link/PHY has generated an error condition. Such a message may be formatted, for example, as an SMP/SSP message exchange between the SAS initiator and the SAS expander in accordance with SAS standards. As noted above, such an exchange may be initiated by a poll or request from the initiator directed to the enhanced SAS expander. The SAS expander may then return current link error status information. As noted above, since the enhanced SAS expander will take action to reduce potential for further loss of data integrity, the polling by the SAS initiator may be far less frequent then the polling required in prior techniques where the initiator, per se, is responsible for initially sensing the link error condition.

Element 308 then performs an appropriate action to reduce the possibility of further loss of data integrity due to failure of the identified link/PHY. For example, the link/PHY associated with the newly discovered link level error may be disabled to prevent further transmissions through the failed link/PHY. Other processing (not shown) well known to those of ordinary skill in the art may re-enable the disabled link/PHY when appropriate corrective measures have been enacted. Element 310 then determines whether the failed link/PHY is a portion of a SAS wide port that comprises multiple PHYs operating as a logical grouping of related transmission links. If the failed link is not associated with a SAS wide port, element 314 is operable to disable the logical port associated with the single failed link/PHY. Processing then continues looping back to element 302 to determine whether any other link error status registers associated with other links/PHYs also indicate a newly discovered failure. If element 310 determines that the newly failed link is part of a SAS wide port (i.e., on of the plurality of links that make up a SAS wide port), element 312 is next operable to determine whether all links/PHYs associated with the identified wide port have failed with some error status. If not, processing continues at element 302 as above to determine whether any other links have failed. If element 312 determines that all links/PHYs associated with a SAS wide port have failed, element 314 is operable, as above, to disable the failed logical wide port. Processing then continues as above with the element 302 to continue checking the status for other links/PHYs associated with the enhanced SAS expander.

Those of ordinary skill in the art will recognize that other method steps may be incorporated to effectuate automated remedial action for particular types of failures. Further, particular errors such as simple transmission parity errors may be remedied through retransmissions without necessity for disabling the failed link/PHY or the associated logical port. Those of ordinary skill in the art will readily recognize a variety of such error conditions that may be automatically remedied through appropriate retries or other remedial action initiated by the SAS expander without need for disabling either the failed link or the associated logical port.

Still further, those of ordinary skill in the art will recognize a wide variety of equivalent method steps for performing the desired self monitoring of PHYs associated with an enhanced SAS expander. As above, key to the present invention is that the SAS initiator device need not utilize valuable communication bandwidth in the SAS port coupling the initiator to the SAS expander. By obviating the need for the SAS initiator to periodically scan or pole the SAS expander to read error status registers, valuable communication bandwidth is conserved. Thus, the method of FIG. 3 provides for rapid detection of SAS expander link errors with reduced overhead consumption of valuable bandwidth between the SAS initiator and the SAS expander.

Where multiple SAS expanders are present in the fabric of a SAS domain, each SAS expander may monitor its own links/PHYs by performing the method of FIG. 3 (or equivalent method steps) and may report its discovered errors to associated SAS initiator devices.

The methods operable in the SAS expander may be implemented in custom hardware circuits or may be performed by execution of programmed instructions in firmware running on a processor internal to the expander. Such design choices are readily apparent to those of ordinary skill in the art.

Actions to take to help prevent loss of data integrity over a failed link/PHY may include, but are not limited to, restricting frames to transmission only over known good PHYs in a SAS wide port by disabling only the defective PHY but not the logical port, issuing an "OPEN REJECT" for frames bound to a target device connected to a failed PHY, performing a "PHY Reset" on the failed PHY and monitor the affects thereof on continued link operation (to determine if the reset makes the error condition better or worse), and informing the SAS initiator in the SAS domain of the failed PHY. As noted above, those of ordinary skill in the art will readily recognize appropriate application of these and other remedial/reporting actions to be taken in accordance with the particular types of failures detected.

Figure 4:
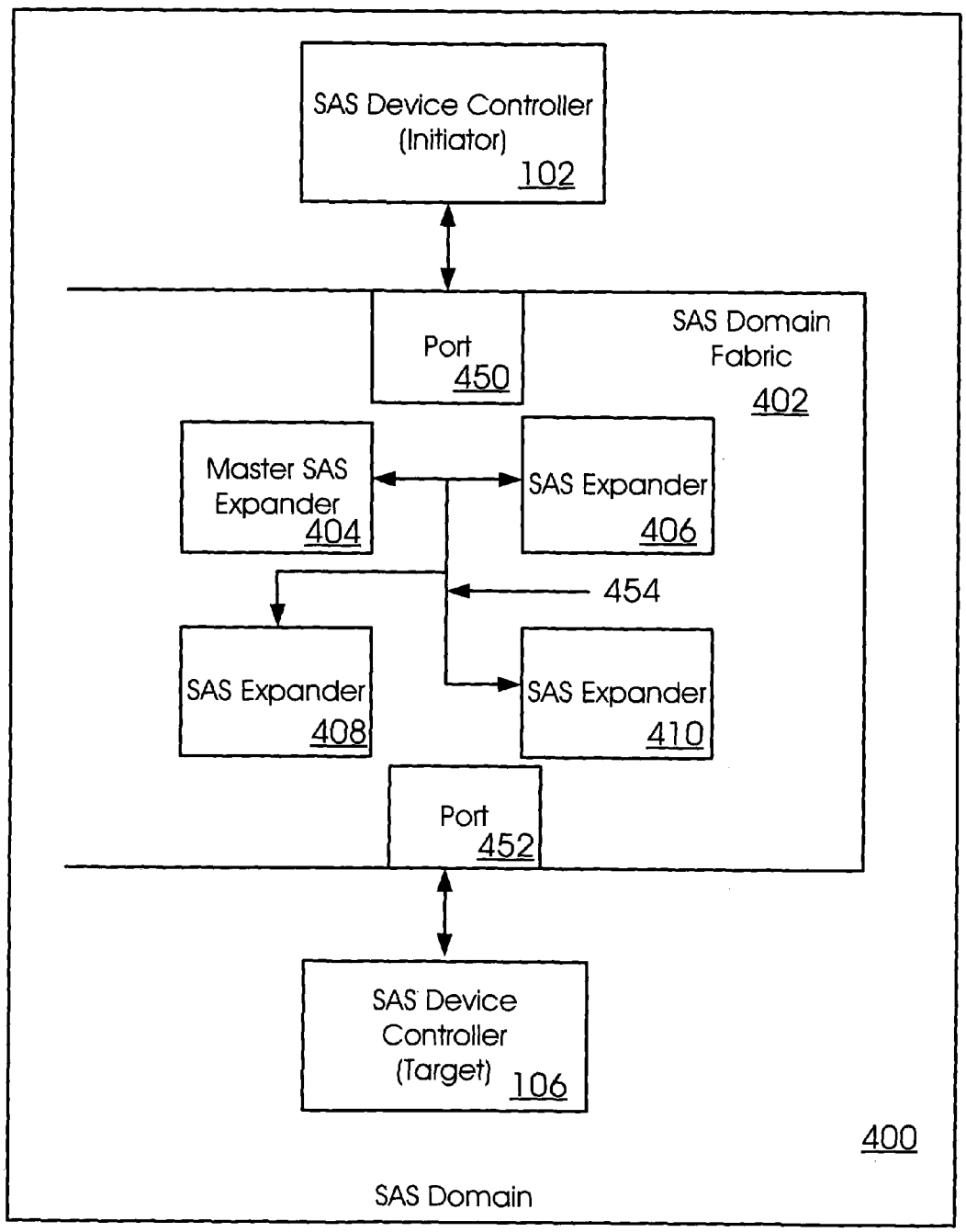
FIG. 4 is a block diagram of a SAS domain with a master SAS expander embodying features and aspects hereof for SAS expander link error self monitoring.

Another aspect hereof provides that, in a SAS domain comprising a plurality of SAS expanders, one of the SAS expanders may be designated a master expander such that it may perform a method such as described above and FIG. 3 to monitor link error status for all PHYs of all expanders in the SAS domain. FIG. 4 depicts such an exemplary SAS domain 400 wherein a SAS initiator device 102 may communicate with a SAS target device 106 through a SAS domain fabric 402. The initiator device 102 is coupled to a logical port 450 associated with one of the several expanders in the SAS domain fabric 402. In like manner, the SAS target device 106 may be coupled to the SAS domain fabric 402 through a logical port 452 also associated with one of the plurality of SAS expanders in the SAS domain fabric 402.

SAS domain fabric 402 may include a plurality of SAS expanders 404, 406, 408, and 410. SAS expander 404 is designated by configuration of the SAS domain fabric as a master SAS expander. Such a master SAS expander may access error status registers associated with links/PHY of the master SAS expander 404 as well as error status register of all other SAS expanders in the fabric 402. For example, master SAS expander 404 may monitor error status of its own links as well as for links associated with SAS expanders 406, 408, and 410. Communications among the various SAS expanders may be achieved through exchanges totally within SAS domain fabric 402. As shown in FIG. 4, communication links 454 may be used for exchange of information between master SAS expander 404 and other SAS expanders 406, 408, and 410 of the SAS fabric 402. Such communications exchanged within the SAS domain fabric 402 provide the benefits discussed above in that valuable communication bandwidth associated with port 450 between the SAS initiator 102 and the SAS domain fabric 402 is still conserved while the SAS expanders of the fabric 402 monitor themselves for important errors and status. The master SAS expander 404 may then notify SAS initiator device 102 as discussed above with respect to FIG. 3. Those of ordinary skill in the art will readily recognize minor modifications to the method discussed above with respect to FIG. 3 to permit a master SAS expander to read error status registers not only for its own links but also for those of other SAS expanders within the SAS domain fabric.

While the invention has been illustrated and described in the drawings and foregoing description, such illustration and description is to be considered as exemplary and not restrictive in character. One embodiment of the invention and minor variants thereof have been shown and described. Protection is desired for all changes and modifications that come within the spirit of the invention. Those skilled in the art will appreciate variations of the above-described embodiments that fall within the scope of the invention. In particular, those of ordinary skill in the art will readily recognize that features and aspects hereof may be implemented equivalently in electronic circuits or as suitably programmed instructions of a general or special purpose processor. Such equivalency of circuit and programming designs is well known to those skilled in the art as a matter of design choice. As a result, the invention is not limited to the specific examples and illustrations discussed above, but only by the following claims and their equivalents.

What is claimed is:

1. A method for detecting link level errors for links in a serial attached SCSI (SAS) expander, the method comprising:
   periodically reading error status registers within said SAS expander and associated with said links wherein the step of reading is performed within the SAS expander without utilizing bandwidth of any SAS links coupled to the SAS expander; and
   notifying a SAS initiator external to the SAS expander and coupled with the SAS expander when a periodic reading of said error status registers detects a link error in an associated failed SAS link,
   wherein the link error includes one or more of: incorrect DWORD disparity in a transmission, loss of DWORD bit synchronization, and invalid DWORD errors.

2. The method of claim 1 further comprising:
   initiating an action within the SAS expander to preclude further loss of data integrity on the failed SAS link following detection of said link error.

3. The method of claim 2 where the failed SAS link is directly coupled to a SAS device as a standard width SAS port and wherein the step of initiating an action further comprises:
   shutting down the failed SAS link to prevent further frame transmissions thereon.

4. The method of claim 2 wherein the failed SAS link is part of a SAS wide port and wherein the step of initiating an action further comprises:
   restricting frames to transmission over other links if the SAS wide port.

5. The method of claim 2 wherein the step of initiating an action further comprises:
   issuing an OPEN REJECT for frames destined to a SAS target device connected to the failed link.

6. The method of claim 2 wherein the step of initiating an action further comprises:
   performing a PHY reset on the failed link; and
   monitoring operation of the failed link in response to the PHY reset to determine if the error persists.

7. The method of claim 1 wherein the SAS expander is one of multiple SAS expanders configured in a SAS domain and wherein the method further comprises:
   designating one of the multiple SAS expanders a master SAS expander,
   wherein the step of periodically reading is performed within the master SAS expander to read error status registers within the master SAS expander and to read error status registers within other SAS expanders of the multiple SAS expanders in the SAS domain.

8. In a serial attached SCSI (SAS) domain including a SAS initiator, apparatus comprising:
   a SAS expander having multiple PHYs associated therewith and at least one of said multiple PHYs coupled to the SAS initiator wherein the SAS initiator is external to the SAS expander and wherein the SAS expander includes:
      a link error status register indicative of a link error associated with at least one PHY of the multiple PHYs;
      a link error detector coupled to the link error status register for detecting occurrence of a link error on the failed PHY by reading the link error status register without utilizing communication bandwidth between the SAS expander and the SAS initiator; and
      a link error notifier for notifying the SAS initiator of a detected error,
   wherein the detected error includes one or more of: incorrect DWORD disparity in a transmission, loss of DWORD bit synchronization, and invalid DWORD errors.

9. The apparatus of claim 8 wherein the SAS expander further includes:
   a link error handler for initiating an action to reduce potential for lost data integrity on the failed PHY.

10. The apparatus of claim 9 wherein the failed PHY is one of multiple PHYs comprising a SAS wide port and wherein the link error handler is operable to restrict transmission of frames to non-failed PHYs of the multiple PHYs comprising the SAS wide port.

11. The apparatus of claim 9 wherein the link error handler further comprises:
   means for issuing an OPEN REJECT for frames destined to a SAS target device connected to the failed PHY.

12. The apparatus of claim 9 wherein the link error handler further comprises:

means for performing a PHY reset on the failed link; and means for monitoring operation of the failed link in response to the PHY reset to determine if the error persists.

13. The apparatus of claim 8 wherein the SAS expander is designated a master SAS expander and wherein the apparatus further comprises:

a second SAS expander having associated error status registers, wherein the master SAS expander is adapted to read the error status registers associated with the second SAS expander without utilizing communication bandwidth between the master SAS expander and the SAS initiator.

14. Apparatus in a serial attached SCSI (SAS) expander for detecting link level errors for links in the SAS expander, the SAS expander comprising:

means for periodically reading error status registers within said SAS expander and associated with said links wherein reading is performed within the SAS expander without utilizing bandwidth of any SAS links coupled to the SAS expander; and means for notifying a SAS initiator external to the SAS expander and coupled with the SAS expander when a periodic reading of said error status registers detects a link error in an associated failed SAS link, wherein the link error includes one or more of: incorrect DWORD disparity in a transmission, loss of DWORD bit synchronization, and invalid DWORD errors.

15. The apparatus of claim 14 further comprising:

means for initiating an action within the SAS expander to preclude further loss of data integrity on the failed SAS link following detection of said link error.

16. The apparatus of claim 15 where the failed SAS link is directly coupled to a SAS device as a standard width SAS port and wherein the means for initiating an action further comprises:

means for shutting down the failed SAS link to prevent further frame transmissions thereon.

17. The apparatus of claim 15 wherein the failed SAS link is part of a SAS wide port and wherein the means for initiating an action further comprises:

means for restricting frames to transmission over other links if the SAS wide port.

18. The apparatus of claim 15 wherein the means for initiating an action further comprises:

means for issuing an OPEN REJECT for frames destined to a SAS target device connected to the failed link.

19. The apparatus of claim 15 wherein the means for initiating an action further comprises:

means for performing a PHY reset on the failed link; and monitoring means to monitor operation of the failed link in response to the PHY reset to determine if the detected link error persists.

20. The apparatus of claim 14 wherein the SAS expander is one of multiple SAS expanders configured in a SAS domain and wherein the method further comprises:

designating one of the multiple SAS expanders as a master SAS expander, wherein reading is performed within the master SAS expander to read error status registers within the master SAS expander and to read error status registers within other SAS expanders of the multiple SAS expanders in the SAS domain.

* * * * *